United States Patent
Geis-Esser

(10) Patent No.: US 12,246,722 B2
(45) Date of Patent: Mar. 11, 2025

(54) ENERGY MANAGEMENT OF AN ELECTRICALLY DRIVEN VEHICLE

(71) Applicant: KNORR-BREMSE Systeme fuer Nutzfahrzeuge GmbH, Munich (DE)

(72) Inventor: Daniel Geis-Esser, Munich (DE)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 186 days.

(21) Appl. No.: 17/738,137

(22) Filed: May 6, 2022

(65) Prior Publication Data
US 2022/0355796 A1    Nov. 10, 2022

(30) Foreign Application Priority Data
May 7, 2021   (DE) .................... 10 2021 204 674.6

(51) Int. Cl.
| | |
|---|---|
| *B60W 30/188* | (2012.01) |
| *B60L 7/20* | (2006.01) |
| *B60L 50/50* | (2019.01) |
| *B60W 10/08* | (2006.01) |
| *B60W 10/18* | (2012.01) |
| *B60W 10/26* | (2006.01) |

(52) U.S. Cl.
CPC ............ *B60W 30/188* (2013.01); *B60L 7/20* (2013.01); *B60L 50/50* (2019.02); *B60W 10/08* (2013.01); *B60W 10/18* (2013.01); *B60W 10/26* (2013.01)

(58) Field of Classification Search
CPC .......... B60L 58/40; B60L 55/00; B60L 58/30; B60L 11/00; G01R 31/387; B60W 20/14
See application file for complete search history.

(56) References Cited

U.S. PATENT DOCUMENTS

| | | |
|---|---|---|
| 7,370,917 B2 | 5/2008 | Battistella et al. |
| 8,838,356 B2 | 9/2014 | Mederer et al. |
| (Continued) | | |

FOREIGN PATENT DOCUMENTS

| | | | | |
|---|---|---|---|---|
| CN | 109239613 A | * | 1/2019 | ........... G01R 31/387 |
| CN | 109823188 A | * | 5/2019 | ................ B60L 7/18 |
| (Continued) | | | | |

OTHER PUBLICATIONS

Cover page of EP 3 402 705 A0 published Nov. 21, 2018 (one (1) page).

(Continued)

*Primary Examiner* — Yuri Kan
(74) *Attorney, Agent, or Firm* — Crowell & Moring LLP

(57) ABSTRACT

A method for operating a vehicle in particular a commercial vehicle having electric energy storage and an electric driving machine, includes determining an absorbable amount of energy of the electric energy storage, determining a driving route drivable by the vehicle at least partially in an overrun mode, and determining a recuperation power by which the vehicle may by operated along the driving route and/or determining a target speed at which the vehicle is to be driven on the driving route, such that at the end of the driving route the energy content of the energy storage has been increased by the determined absorbable amount of energy. Also provided is a device, a computer program product and a storage medium for the energy management of an electrically driven vehicle as well as such vehicle.

20 Claims, 3 Drawing Sheets

(56) References Cited

U.S. PATENT DOCUMENTS

| | | | |
|---|---|---|---|
| 8,977,467 B2 | 3/2015 | Herges et al. | |
| 10,029,660 B2 | 7/2018 | Buchner et al. | |
| 10,272,889 B2 | 4/2019 | Finkl et al. | |
| 10,913,374 B2* | 2/2021 | Son | B60L 55/00 |
| 2003/0068538 A1* | 4/2003 | Lahiff | B60L 58/30 |
| | | | 429/430 |
| 2018/0111591 A1 | 4/2018 | Fry et al. | |

FOREIGN PATENT DOCUMENTS

| | | | |
|---|---|---|---|
| DE | 10 2016 011 411 A1 | 3/2018 | |
| DE | 10 2017 100 671 A1 | 7/2018 | |
| DE | 10 2018 132 785 A1 | 6/2020 | |
| EP | 2 783 928 A1 | 10/2014 | |
| EP | 3 018 020 A2 | 5/2016 | |
| EP | 3 290 280 A1 | 3/2018 | |
| GB | 2499651 A | 8/2013 | |
| GB | 2535530 A | 8/2016 | |
| GB | 2535532 A | 8/2016 | |
| RU | 2012131789 A * | 1/2014 | B60L 11/00 |
| WO | WO 2016/169966 A1 | 10/2016 | |
| WO | WO 2016/169967 A1 | 10/2016 | |
| WO | WO 2017/121597 A1 | 7/2017 | |

OTHER PUBLICATIONS

Cover page of EP 3 286 054 A0 published Feb. 28, 2018 (one (1) page).

Cover page of EP 3 286 055 A0 published Feb. 28, 2018 (one (1) page).

* cited by examiner

ENERGY MANAGEMENT OF AN ELECTRICALLY DRIVEN VEHICLE

CROSS REFERENCE TO RELATED APPLICATION

This application claims priority under 35 U.S.C. § 119 from German Patent Application No. 102021204674.6, filed May 8, 2021, the entire disclosure of which is herein expressly incorporated by reference.

BACKGROUND AND SUMMARY OF THE INVENTION

The present invention relates to a method, a device, a computer program product, a storage medium for the energy management of an electrically driven vehicle as well as such a vehicle.

For commercial vehicles driven by means of electric driving machines, in particular the following options are available for implementing a permanent braking function: employment of a retarder, supply of a recuperation power of the driving machine to an electric energy storage, conversion of power generated generatively by the driving machine into heat by means of a braking resistor. The braking resistor and retarder are additional components requiring installation space in the vehicle and increasing the production costs of the vehicle. On the other hand, these technical solutions have an almost constant availability during the operation of the vehicle. The supply of recuperation power to the electric energy storage is the preferred method, since no further components are required to implement the function of the permanent brake. However, here, the availability depends on the absorbable amount of energy of the energy storage. If it cannot absorb any further energy by recuperation, also the function of the permanent brake can no longer be realized in such manner. Here, in particular the length of the driving route as well as its slope and the vehicle speed have an effect. If the energy storage is no longer capable of absorbing energy, either a change to a secondary system (e.g. braking resistor or retarder) has to be made, or the service brake has to be used, in which case driving has to be carried out particularly at reduced speed, as the service brake is not designed for such a load, which may cause damage to the service brake.

Accordingly, it is an object of present invention to show a possibility to allow the operation of an electrically driven vehicle such that a driving route may be driven solely with a permanent braking effect based on recuperation.

This object is solved by the subject matters of the independent claims. Advantageous modifications are subject to the dependent claims.

According to the invention, a method for operating a vehicle, in particular a commercial vehicle, comprising an electric energy storage and an electric driving machine, is provided comprising the following steps:
step A: determining an absorbable amount of energy of the electric energy storage;
step B: determining a driving route drivable by the vehicle at least partially in an overrun mode;
step C: determining a recuperation power, by which the vehicle can by operated along the driving route and/or determining a target speed, at which the vehicle is to be driven on the driving route.

Step C is performed such that at the end of the driving route the energy content of the energy storage has been increased by the absorbable amount of energy determined in step A.

Here, by a recuperation operation it is meant that the vehicle generates generatively an electric power by its electric driving machine and stores it as energy in the electric energy storage.

The electric energy storage comprises particularly a traction battery.

In the recuperation operation, a decelerating effect on the vehicle is achieved by the electric driving machine. The recuperation operation may therefore be intentionally used to cause a braking effect on the vehicle.

This braking effect may be particularly used to decelerate the vehicle in terms of a permanent brake to particularly provide a permanent braking power on a slope to not exceed a maximum admissible speed or to maintain a desired speed, respectively, on such route.

The recuperation power determined in step C and/or the target speed determined in step C may each be a constant value. However, it may also be provided that one or both are variably specified. Thereby, it may be provided that the values change over time or in accordance with the driving route travelled. Accordingly, a characteristic curve may be specified for the recuperation power and/or the target speed, which is based temporally or locally.

The driving route determined in step B does not necessarily have to be determined by the method. Step B may also comprise that a driving route, which has been provided by another system, such as a navigation system, is used in step B, which is then equated with the driving route. Step B may also comprise that a driving route of a longer route, which has been provided by another system, such as a navigation system, is determined as subsection.

Preferably, the absorbable amount of energy describes the amount of energy until reaching the maximum energy content of the energy storage. The maximum energy content of the storage thus corresponds to the amount of energy, which is absorbable by the storage and which is available again to be used in the vehicle. The maximum energy content may change due to aging effects. This may be considered when performing the method. The absorbable amount of energy considers the amount of energy actually in the energy storage.

Alternatively, the absorbable amount of energy describes the amount of energy until reaching a predetermined energy content of the energy storage, which is less than the maximum energy content of the energy storage, wherein a buffer capacity in the energy storage is preferably saved. Thereby, the energy storage may absorb further energy, for example, when a higher recuperation power is generated for a short time. For example, this is the case when the vehicle on the driving route follows a preceding vehicle, which drives at a speed requiring a higher recuperation power as determined in step C. The buffer capacity is preferably used to charge the energy storage temporarily beyond the predetermined energy content of the energy storage, wherein the surplus energy is subsequently delivered again by the energy storage when driving on the driving route.

Preferably, the driving route is characterized by a starting point and a terminal point, wherein the starting point is preferably geographically higher that the terminal point. Starting and terminal point are preferably characterized by geographic coordinates and/or by an address. In such event, the driving route represents the connection between both points, wherein public roads are particularly used for the connection. In that the starting point is higher than the terminal point, it is advantageously ensured that potential energy by driving on the driving route is converted by the vehicle in electric energy by recuperation and may then be stored in the energy storage.

Preferably, the vehicle comprises at least one gear, wherein step C comprises determining a target gear ratio of the at least one gear. The at least one gear may have one or more discrete transmission ratio(s), as in the case of a manually switchable gear, an automated gearbox or an automatic gear. However, the at least one gear may, alternatively or in addition, provide an infinitely variable gear ratio. Alternatively or in addition, it may be provided that the vehicle comprises axle or wheel specific gears and/or that the at least one gear is arranged specifically for each axle or wheel. By the determination of the target gear ratio the electric driving machine may be operated in an operating point adapting the recuperation power such that the energy storage is charged at the appropriate speed for the driving route, such that it is not charged too fast such that the absorbable amount of energy is not charged into the energy storage until the end of the driving route. Otherwise, the recuperation capability would be omitted and no more permanent braking function would be available by the generative operation of the driving machine. Concurrently, it may be achieved that the energy storage is not charged too slowly. This would have the disadvantage that the storage unit would not have absorbed the amount of energy determined in step A at the end of the driving route, but a smaller amount of energy. This would in turn result in a range disadvantage for the vehicle, since the energy storage could have absorbed more energy.

Preferably, the driving route comprises at least one route section requiring an energy consumption from the electric energy storage. By this, a route section may be considered that only provides a slight slope such that the vehicle has to be driven by energy consumption from the energy storage, wherein the energy is supplied to the electric driving machine, for example, to comply with a mandatory minimum speed as prescribed on highways. Further, this may also be route sections which run flat, i.e. which thus do not provide a slope or incline. Also here, the vehicle must expend energy from the energy storage, if the vehicle's inertia is insufficient to perform a predetermined driving task, such as staying above a predetermined minimum speed. Finally, such a route section may comprise an incline.

In general, the inertia of the vehicle may also be considered. Thus, for example, an incline may also be conquered by the inertia of the vehicle without the need to expend energy from the energy storage.

In general, it can be stated that the method, in particular one or more of the steps A, B and C, considers that recuperation does not have to or cannot be performed continuously on the driving route. Rather, it may be considered, in particular in step A, that part of the energy recovered on the driving route is consumed again while still driving on the driving route.

Therefore, alternatively or in addition, an amount of energy required when driving the driving route is considered when performing step A.

Preferably, the vehicle comprises at least one further electric energy storage, wherein the further energy storage is incorporated when performing step A. Hereby, a charging strategy may be implemented such that, for example, the recuperation power is always supplied to the energy storage that is capable of currently absorbing more energy and/or capable of storing the energy with a better efficiency.

Preferably, a weight, a driving resistance, in particular a rolling and/or air resistance, and/or an efficiency, in particular of the drive train and/or the electric energy storage, of the vehicle is considered. A weight may in particular considered as a fixed value by assumption or coding. However, it may also be determined and thus considered by performing the method. For example, this may be carried out by weighing the vehicle on a vehicle scale or by respective in-vehicle systems that, for example, are part of the chassis such as an air suspension. In particular for commercial vehicles, whose loading state may vary significantly from run to run, a determination of the vehicle weight is advantageous. A rolling resistance is influenced by the tires of the vehicle and by rotating or dragged parts of the drive train such as rims, clutches and shafts. It may also be considered as a fixed value by assumption or coding. This relates particularly to parts of the drive train. On the wheel-side, the rolling resistance is significantly influenced by the air pressure within the tire. This may be considered as a fixed value by assumption or coding. However, the air resistance may also be measured and thus provided as input value or directly determined by an in-vehicle system such as an air pressure monitoring. Thus, a rolling resistance is determinable. The air resistance may be considered as a fixed value by assumption or coding. For vehicles, whose load is transported exposed, the air resistance is strongly dependent on the actual load or its shape, which is positioned in the airstream. The efficiencies may be considered as a fixed value by assumption or coding.

Alternatively or in addition, the driving resistance may also be determined by determining the required energy demand to move the vehicle on a, preferably flat, driving route at constant speed. For example, this may be carried out via the power consumption of the electric driving machine used for moving the vehicle and/or the energy delivery by the electric energy storage. This determination provides the advantage that substantially no details of single components influencing the driving resistance have to be known, but the actual driving resistance, which particularly results from a combination of the rolling, air and drive train resistance, may finally be determined. This method for determining the driving resistance is also possible on driving routes with known slope or known incline. It is also conceivable to perform this method for determining the driving resistance on a driving route, which is flat and/or provides an incline and/or a slope. Further, this method for determining the driving resistance may also be performed continuously, when the vehicle is driven, preferably exclusively, by the electric driving machine. An information about the incline or the slope of the driving route or whether the driving route is flat may be obtained, for example, from navigation data and/or data of vehicle sensors such as acceleration sensors and/or inclination sensors.

Preferably, the driving route is determined in step B under consideration of navigation data. As already explained above, the driving route may be defined by a starting and a terminal point. Further, by incorporation of navigation data such as coordinate or address specifications, a driving route may be determined, which is energetically favorable, i.e. that a driving route is determined, on which less sections are present that require an energy delivery by the energy storage. For example, if two possible driving routes between a starting and terminal point are available, the vehicle will preferably select the driving route allowing, in particular under consideration of possible losses, to store more energy in the energy storage. For example, if the first driving route provides a slope route section followed by a flat route section and the second driving route provides a slop route section followed by an inclining route section, from this aspect, the first driving route may be selected, since the flat route section requires usually less energy consumption from the energy storage than the inclining route section.

Preferably, the method is discontinued and, preferably, the steps A, B and C are re-performed, when the vehicle departs from the driving route or when an unexpected event occurs when driving along the driving route, such that the vehicle is not capable of being operated by the recuperation power and/or that the target speed cannot be met. For example, a departing from the driving route takes place, if a traffic jam has formed on the driving route, which is to be bypassed by departing, or if the destination changes during the run such that, for example, an intermediate destination is included in the route of the vehicle. A traffic jam may also correspond to an unexpected event. Further, by this, accidents or road closures may be meant. The method is preferably re-performed after it has been discontinued such that in particular the steps A, B and C are re-performed, wherein information about unexpected events or departing from the driving route may be considered as boundary conditions during the rerun.

Preferably, the method comprises, before driving the driving route, that starting from the actual energy content of the energy storage it is determined, which amount of energy for arriving at the driving route is required, and this amount of energy is then at least partially, preferably entirely, delivered by the energy storage to move the vehicle to the driving route, wherein the amount of energy delivered by the energy storage or determined, respectively, for arriving at the driving route is considered in step A. In this way, energy from the energy storage is consumed before driving the driving route, which may subsequently be recovered by recuperation. Accordingly, it is advantageously achieved that thereby the absorbable amount of energy of the electric energy storage is increased and thus the driving route may be driven at a higher speed and/or higher recuperation power. More preferably, while moving the vehicle to the driving route, all further drives such as a conventional or combustion engine drive or energy supplier, such as a fuel cell, are deactivated or at least operated such that they do not exclusively serve for the movement of the vehicle, to consume as much energy as possible from the energy storage such as to increase the absorbable energy determined in step A. Ideally, the energy is exclusively delivered by the energy storage in such event.

According to the invention, a device for performing the method described above is provided, wherein the device comprises the following:
- a control device having a data processing device configured for performing the method described above;
- at least one interface configured for receiving data of the vehicle;
- at least one interface configured for delivering control data to the vehicle; wherein the device is preferably configured to be mounted in or on the vehicle.

The data of the vehicle comprise particularly data required for performing the method or specific modifications of the method such as a current gear ratio, the current recuperation power, the current vehicle speed, the current energy content of the energy storage and/or the starting and terminal point of the driving route.

The control data comprise particularly data for controlling the drive train of the vehicle. In particular, the recuperation power determined in step C and/or the target speed determined in step C is passed on to the vehicle to respectively drive on the driving route.

The device features described in the above description of the method relate to advantageous modifications of the device according to the invention.

According to another aspect of the present invention a vehicle, in particular a commercial vehicle, is provided, comprising the following:
- at least one energy storage; and
- an electric driving machine; wherein
the vehicle comprises a device as described above or is configured for performing the method as described above.

In particular, the vehicle is configured to store the energy generated generatively by the driving machine in the at least one electric energy storage.

Preferably, the vehicle is configured as truck, tractor, trailer or combination of tractor and trailer.

The vehicle is an electrically driven vehicle. It may comprise a fuel cell for the electric drive interacting with the driving machine. Alternatively or in addition, the vehicle may also be hybrid-driven.

The vehicle features described in the above description of the method or device relate to advantageous modifications of the vehicle according to the invention.

According to the invention, there is further provided a computer program product comprising code means which, when executed on a data processing device, in particular on a data processing device of the device described above, cause it to perform the method described above.

Finally, according to the invention, a storage medium with a computer program product described above is provided.

With computer program product or storage medium, advantageously, the possibility is provided to configure existing data processing devices for performing the method described above. Thus, also a vehicle comprising a data processing device may be configured to perform the method described above.

The embodiments of the invention described above and below are not to be regarded as limiting the subject matter of the invention. Rather, further subject matter according to the invention may be obtained by adding, omitting or changing individual features.

Preferred embodiments of the invention are described below with the aid of the accompanying drawings.

DETAILED DESCRIPTION

Figure 1:
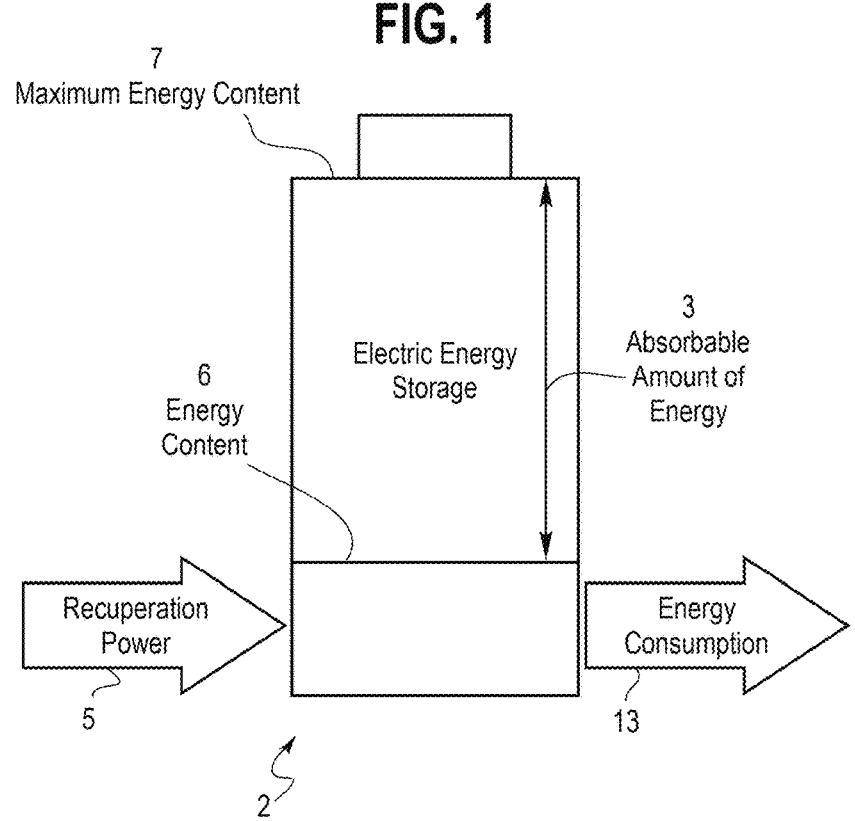
FIG. 1 shows a schematic representation of an electric energy storage illustrating a first aspect of an embodiment of the invention.

FIG. 1 shows a schematic representation of an electric energy storage illustrating a first aspect of an embodiment of the invention.

An electric energy storage 2 of a vehicle is shown, which may be supplied with a recuperation power 5, which has been generated generatively by an electric driving machine (not shown), wherein an energy consumption 13 from the energy storage 2 may be carried out. Said consumed energy may be used to drive the vehicle and/or to operate secondary consumers such as an air conditioning unit, a cooling unit or the like.

The representation of the electric energy storage 2 serves as schematic scale upwards to illustrate the method according to the invention.

At the shown point in time, the energy storage 2 provides the energy content 6. It is less than a maximum energy content 7, up to which the energy storage 2 is capable of absorbing energy. The absorbable amount of energy 3 of the energy storage 2 may be determined by the difference between the energy content 6 and the maximum energy content 7. This is substantially performed in step A of the method described above.

The driving route determined in step B and the recuperation power or target speed, respectively, determined in step C are aligned in such a way that the energy content 6 has been increased by the absorbable amount of energy 3 at the end of the driving route, i.e. when the vehicle has driven the determined driving route, such that the energy content 6 is now equal to the maximum energy content 7.

Here, it may be provided that a power consumption 13 from the energy storage 2 takes place while driving on the driving route. This may be particularly used for driving a part of the driving route.

Essentially, however, a setpoint setting (by the recuperation power and/or the target speed) is specified to the vehicle in such a way that the energy content 6 of the energy storage 2 is not already equal to the maximum energy content 7 during driving on the driving route. In such event, no further recuperation could be possible, which would no longer allow a permanent braking function by means of the recuperation operation. Then, it would have to be changed to another braking system to realize the permanent braking function, which should be avoided.

Further, the setpoint setting is performed such that the energy content 6 of the energy storage 2 corresponds to the maximum energy content 7 at the end of the driving route or such that the energy content has been increased by the absorbable amount of energy 3. If this would not be the case and the energy content 6 would be below the maximum energy content 7, the vehicle would then provide an energetic disadvantage, since the energy storage 2 has not been charged completely.

While performing the method, the energy content 6 may also fall below the energy content, which has been present in the energy storage 2 at the beginning of performing the method, as long as it has been increased at the end by the absorbable amount of energy 3 with respect to the initial energy content 6.

Figure 2:
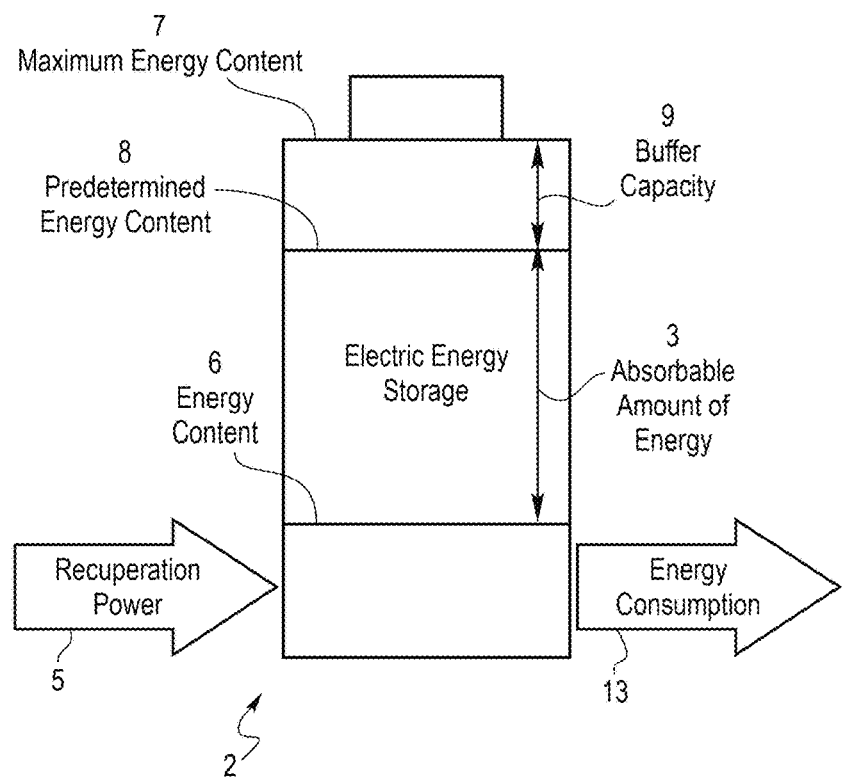
FIG. 2 shows a schematic representation of an electric energy storage illustrating a second aspect of an embodiment of the invention.

FIG. 2 shows a schematic representation of an electric energy storage illustrating a second aspect of the invention.

The representation corresponds substantially to the one in FIG. 1. Accordingly, only the differences will be discussed here.

Here, a predetermined energy content 8 less than the maximum energy content 7 of the energy storage 2 is illustrated. This predetermined energy content 8 determines then the absorbable amount of energy 3. Accordingly, it replaces the maximum energy content 7 when determining the absorbable amount of energy 3 with respect to FIG. 1.

Therefore, the energy storage 2 is not used up to its maximum energy content 7 when performing the method. A buffer capacity 9 is thereby created in the energy storage 2, which is maintained and may be used to absorb further recuperation power in the energy storage 2, for example, to balance errors and inaccuracies when performing the method, in particular steps A and C. Thus, the probability is reduced that the energy content 6 of the energy storage 2 does already reach the maximum energy content 7 before the end of the driving route.

Figure 3:
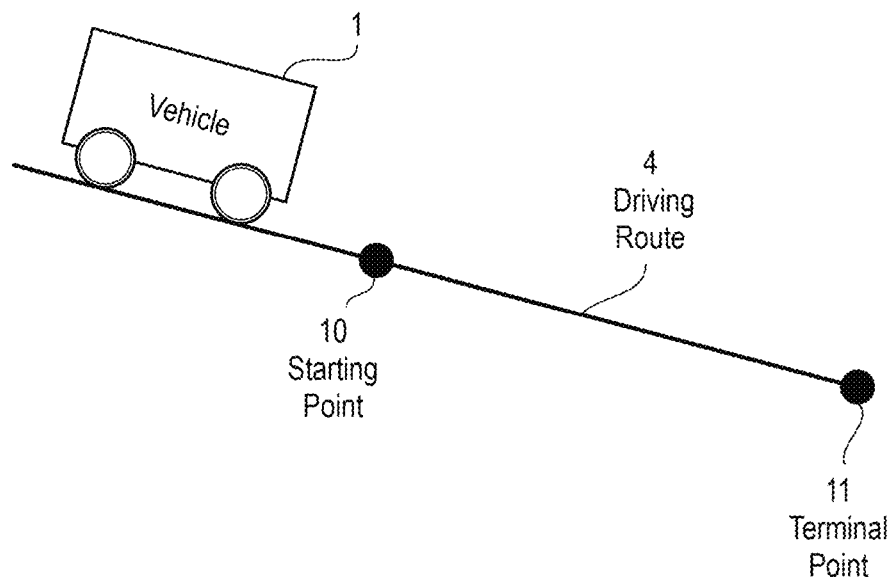
FIG. 3 shows a schematic representation of a driving route illustrating a third aspect of an embodiment of the invention.

FIG. 3 shows a schematic representation of a driving route illustrating a third aspect of the invention.

A vehicle 1 driving on a driving route 4 is shown. The vehicle 1 is configured according to the invention. The driving route 4 is characterized by a starting point 10 and a terminal point 11. Here, the starting point 10 is geographically higher than the terminal point 11. The driving route 4 further comprises a continuous slope.

The driving route 4 is determined in step B of the method. This may be particularly done by setting the starting point 10 and the terminal point 11. The setting may be done by a driver or automatically. For example, if it is known that the vehicle 1 is about to drive a longer slope section, this may be considered automatically or considered also by a driver input, in particular in step B.

According to step C, the recuperation power 5 (cf. FIG. 1 and FIG. 2) is determined such that the energy content 6 of the energy storage 2 when reaching the terminal point 11 has been increased such that an absorbable amount of energy 3 has now being absorbed in the energy storage 2 in a balanced manner.

In this way, the vehicle 1 may travel along the driving route 4 with a permanent braking function, which is solely represented by the generative recuperation power, whereby no further and in particular no wear-prone brake devices of the vehicle 1 are required.

Figure 4:
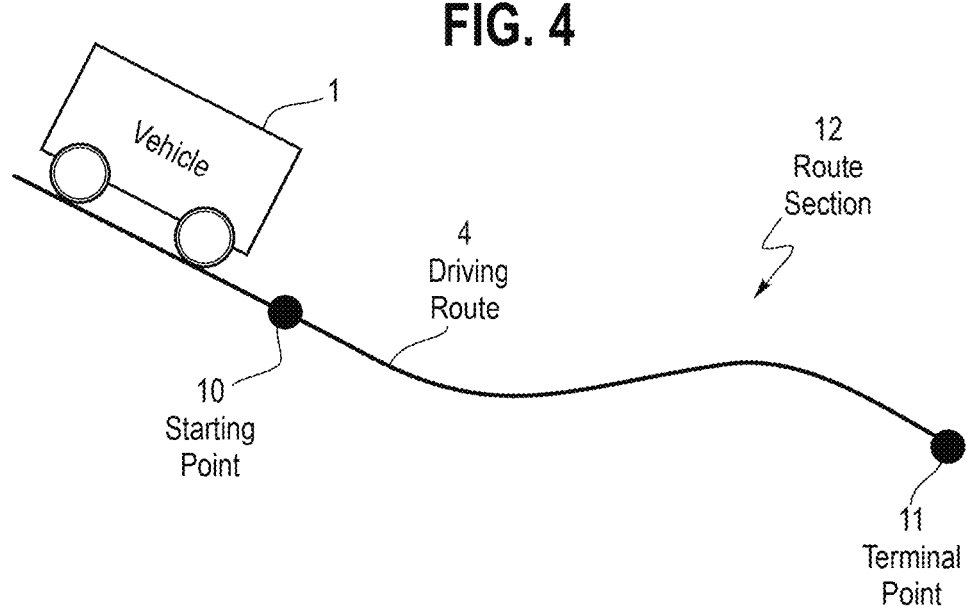
FIG. 4 shows a schematic representation of a driving route illustrating a fourth aspect of an embodiment of the invention.

FIG. 4 shows a schematic representation of a driving route illustrating a fourth aspect of the invention.

Here, in contrast to FIG. 3, a route section 12 comprising an incline is provided on the driving route 4.

If the kinetic energy of the vehicle 1 is not sufficient to pass this route section 12 and, for example, not to fall concurrently below a minimum speed, the vehicle has here to be driven by an energy consumption 13 (cf. FIG. 1 and FIG. 2) from the energy storage 2 for driving the vehicle 1.

This energy consumption 13 may be considered when performing the method, particularly when performing steps A, B and C, such that, for example, a full energy storage 2 is present before the vehicle 1 enters the route section 12, whereby no further recuperation is possible and therefore no further permanent braking function may be realized. However, since energy from the energy storage 2 is consumed in route section 12, capacity in the energy storage 2 is again created, whereby recuperation may be again possible after passing of the route section 12, i.e. driving with the permanent braking function may be again possible.

It may also be provided that the energy content 6 does not correspond to the maximum energy content 7 when arriving at the route section 12, but being in the range of the buffer capacity 9 (cf. FIG. 2).

It may also be provided that, an energy consumption 13 from the energy storage 2 takes place first, whereby the energy content 6 initially decreases and is subsequently increased again by recuperation.

Figure 5:
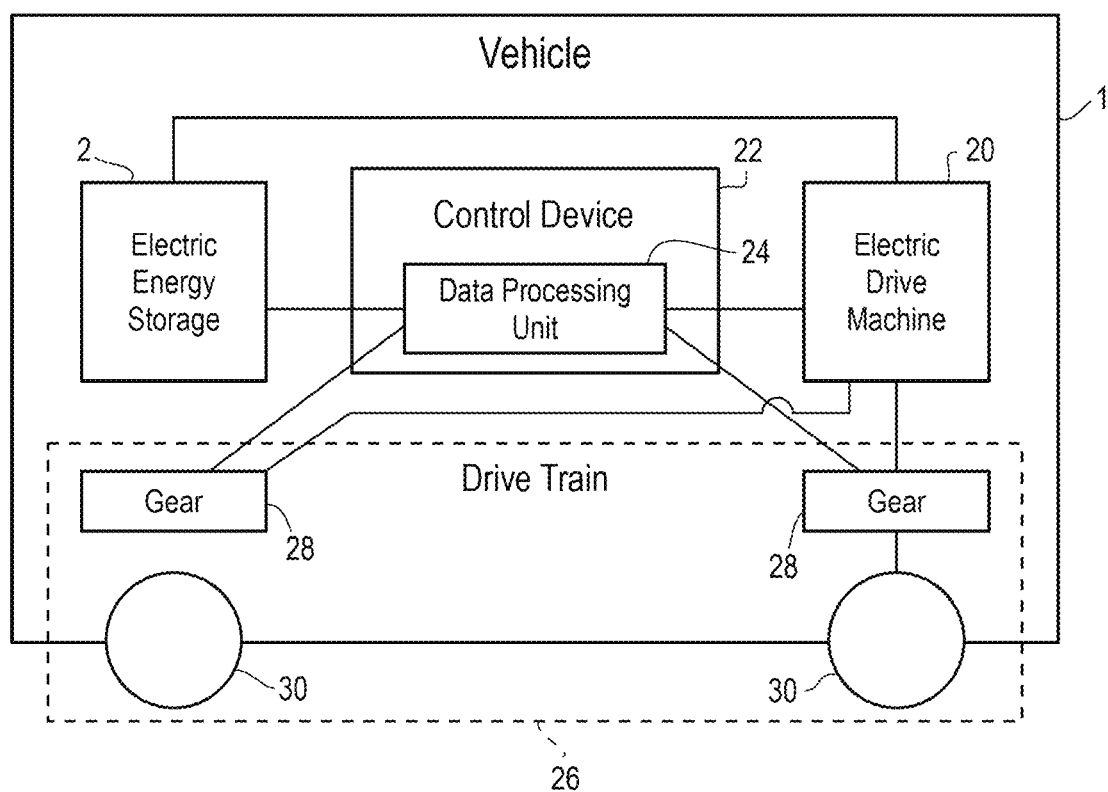
FIG. 5 shows a schematic representation of an embodiment of a vehicle in accordance with a fifth aspect of the invention.

Note that the methods described previously can be performed by a vehicle 1 as previously described and schematically shown in FIG. 5. As shown in FIG. 5, the vehicle 1 includes an electric energy storage 2, such as a traction battery. The electric energy storage 2 is in electrical communication with an electric drive machine 20 and a control 22, wherein the control device 22 includes a data processing device or unit 24. The control device 22 is in electrical communication with a drive train 26 (represented schematically by dashed lines) that includes a gear 28 associated with each wheel 30 of the vehicle 1. The data process device 24 receives data from and sends data to the drive train 26 and its gears 28, the electric energy storage 2, and the electric drive machine 20 in accordance with the methods described previously. The electric energy storage 2 schematically represents one or more electric energy storage structures. Note that FIG. 5 is being presented for illustrative purposes only and so the figure, including the boxes used to represent various elements, should not be construed as limiting the shape, size, position, number, and/or orientation of the elements shown.

LIST OF REFERENCE SIGNS 1 vehicle
2 energy storage
3 absorbable amount of energy
4 driving route
5 recuperation power
6 energy content
7 maximum energy content
8 predetermined energy content
9 buffer capacity
10 starting point
11 terminal point
12 route section
13 energy consumption
20 electric drive machine
22 control device
24 data processing device or unit
26 drive train
28 gear
30 wheel

What is claimed is:

1. A method for operating a vehicle comprising an electric energy storage and an electric driving machine, the method comprising:
    determining an absorbable amount of energy of the electric energy storage of the vehicle, wherein the vehicle further comprises a control device comprising a data processing device that performs the determining via at least one interface configured to receive data of the vehicle; and
    controlling the electric driving machine by the control device and by at least one interface configured for delivering control data to the vehicle so as to supply an amount of recuperation energy to the electric energy storage during an entirety of a driving route driven by the vehicle, such that at the end of the driving route, but not before, energy content of the electric energy storage has been increased by the absorbable amount of energy and such that the entirety of the driving route is driven solely by a permanent braking effect generated by the electric driving machine based on recuperation.

2. The method of claim 1, wherein the amount of recuperation energy is an amount needed for the vehicle to be operated along the driving route.

3. The method of claim 1, wherein the amount of recuperation energy is based on a target speed at which the vehicle is to be driven on the driving route.

4. The method of claim 1, wherein the absorbable amount of energy comprises an amount of energy until reaching a maximum energy content of the electric energy storage.

5. The method of claim 1, wherein the absorbable amount of energy comprises an amount of energy until reaching a predetermined energy content less than a maximum energy content of the electric energy storage.

6. The method of claim 1, wherein the driving route is characterized by a starting point and a terminal point, and wherein the starting point is geographically higher that the terminal point.

7. The method of claim 1, wherein the vehicle comprises at least one gear, and wherein causing comprises determining a target gear ratio of the at least one gear.

8. The method of claim 1, wherein the driving route comprises at least one route section requiring an energy consumption from the electric energy storage.

9. The method of claim 1, wherein an amount of energy required when driving the driving route is considered when determining the absorbable amount of energy.

10. The method of claim 1, wherein the vehicle comprises at least one further electric energy storage.

11. The method of claim 1, wherein the absorbable amount of energy is determined based on a weight, a driving resistance, a rolling resistance, an air resistance, an efficiency of a drive train, and/or an efficiency of the electric energy storage.

12. The method of claim 1, wherein the driving route is determined from navigation data.

13. The method of claim 1, further comprising re-performing the method in response to the vehicle departing from the driving route, an unexpected event occurring when driving along the driving route, the vehicle not being capable of being operated by the recuperation energy, and/or a target speed not being able to be met.

14. The method of claim 1, further comprising:
    before driving the driving route, determining an amount of energy required for driving the driving route; and
    delivering the determined amount of energy at least partially from the electric energy storage to move the vehicle along the driving route;
    wherein the determined absorbable amount of energy is based on the determined amount of energy and/or wherein at least one energy supplier is deactivated while the vehicle is moved to the driving route.

15. A vehicle comprising:
    a battery;
    an electric driving machine configured to provide a permanent braking effect on the vehicle by charging the battery with recuperation energy of the electric driving machine; and
    a data processing unit configured to control the electric driving machine to provide the permanent braking effect on the vehicle along an entire route by ensuring that the battery is prevented from charging to a certain level until the vehicle is at the end of the route and to ensure that the entirety of the driving route is driven solely by a permanent braking effect generated by the electric driving machine based on recuperation.

16. The vehicle of claim 15, wherein the data processing unit is further configured to prevent the battery from being charged to the certain level until the vehicle is at the end of the route by selecting a gear ratio of the electric driving machine.

17. The vehicle of claim 15, wherein the certain level comprises a maximum charging capacity of the battery.

18. The vehicle of claim 15, wherein the certain level comprises a level less than a maximum charging capacity of the battery.

19. The vehicle of claim 15, wherein the driving route is determined from navigation data.

20. A vehicle comprising:
- an electric driving machine;
- an electric energy storage; and
- a control device comprising a data processing device, wherein the control device is configured to control the electric driving machine to supply an amount of recuperation energy to the electric energy storage along an entirety of a driving route, such that a predetermined energy level of the electric energy storage is not reached until an end of the driving route and to ensure that the entirety of the driving route is driven solely by a permanent braking effect generated by the electric driving machine based on recuperation.

* * * * *